(12) United States Patent
Noda

(10) Patent No.: US 8,836,849 B2
(45) Date of Patent: Sep. 16, 2014

(54) IMAGING APPARATUS, CONTROL METHOD FOR IMAGING APPARATUS, AND PROGRAM

(75) Inventor: Hiroshi Noda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 365 days.

(21) Appl. No.: 13/424,168

(22) Filed: Mar. 19, 2012

(65) Prior Publication Data
US 2012/0242862 A1 Sep. 27, 2012

(30) Foreign Application Priority Data
Mar. 24, 2011 (JP) ................. 2011-066411

(51) Int. Cl.
G03B 13/00 (2006.01)
H04N 5/232 (2006.01)
G03B 13/36 (2006.01)

(52) U.S. Cl.
CPC ....... H04N 5/23212 (2013.01); H04N 5/23293 (2013.01); H04N 5/23209 (2013.01); G03B 13/36 (2013.01); H04N 5/23296 (2013.01)
USPC ......................................... 348/345

(58) Field of Classification Search
USPC .......................... 348/345, 347, 349, 353, 354
See application file for complete search history.

(56) References Cited

U.S. PATENT DOCUMENTS

| 2003/0189662 A1* | 10/2003 | Matsuda | 348/345 |
| 2007/0025716 A1* | 2/2007 | Ichimiya | 396/147 |
| 2009/0067828 A1* | 3/2009 | Ono et al. | 396/128 |
| 2010/0110272 A1* | 5/2010 | Sugawara | 348/341 |
| 2010/0150538 A1* | 6/2010 | Ono et al. | 396/104 |

FOREIGN PATENT DOCUMENTS

JP 2008-203454 A 9/2008

* cited by examiner

Primary Examiner — Nicholas Giles
(74) Attorney, Agent, or Firm — Canon U.S.A., Inc., IP Division

(57) ABSTRACT

An imaging apparatus includes a storage control unit configured to, in acquiring a first AF adjustment amount, control a memory to store the first AF adjustment amount and a focal length acquired by a focal length acquisition unit in association with each other, wherein the storage control unit is configured to, in acquiring a second AF adjustment amount, control the memory to store the second AF adjustment amount and the focal length acquired by the focal length acquisition unit in association with each other.

5 Claims, 7 Drawing Sheets

IMAGING APPARATUS, CONTROL METHOD FOR IMAGING APPARATUS, AND PROGRAM

BACKGROUND OF THE INVENTION

1. Field of the Invention

The present invention relates to an imaging apparatus capable of setting autofocus (AF) adjustment amounts of a zoom lens at a plurality of focal lengths, a control method for the imaging apparatus, and a program.

2. Description of the Related Art

Some recent digital cameras include an adjustment mechanism for an automatic focus adjustment result, called AF adjustment or AF fine adjustment, for adjusting a lens drive amount based on preset focus adjustment setting in addition to a lens drive amount for AF.

Japanese Patent Application Laid-Open No. 2008-203454 discusses displaying lens information and correction values when an AF adjustment amount (also referred to as AF fine adjustment value) is measured as focus adjustment setting.

In an imaging apparatus discussed in Japanese Patent Application Laid-Open No. 2008-203454, there is a possibility that various zoom lenses may be mounted on the imaging apparatus, whilst the zoom lenses are subjected to a change in depth of field or amount of image plane movement when their focal lengths are different from each other, and as a result, adjusted correction values may not be appropriate.

SUMMARY OF THE INVENTION

One aspect of the present invention is directed to an imaging apparatus that is capable, when auto AF adjustment processing for measuring an AF adjustment amount is performed, of more appropriately setting the AF adjustment amount by appropriately displaying an instruction for a zooming operation.

According to an aspect of the present invention, an imaging apparatus capable of setting an autofocus (AF) adjustment amount of a zoom lens at a plurality of focal lengths includes a focal length acquisition unit configured to acquire a focal length, a conversion unit configured to detect a deviation amount between a focus position detected by contrast AF and a focus position detected by phase difference AF and to convert the deviation amount into an AF adjustment amount, an instruction display unit configured to display an instruction for prompting a zooming operation to a first zoom position in acquiring a first AF adjustment amount, wherein the instruction display unit is configured to display an instruction for prompting a zooming operation to a second zoom position with a focal length different from that of the first zoom position in acquiring a second AF adjustment amount, and a storage control unit configured to, in acquiring the first AF adjustment amount, control a memory to store the first AF adjustment amount and the focal length acquired by the focal length acquisition unit in association with each other, wherein the storage control unit is configured to, in acquiring the second AF adjustment amount, control the memory to store the second AF adjustment amount and the focal length acquired by the focal length acquisition unit in association with each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
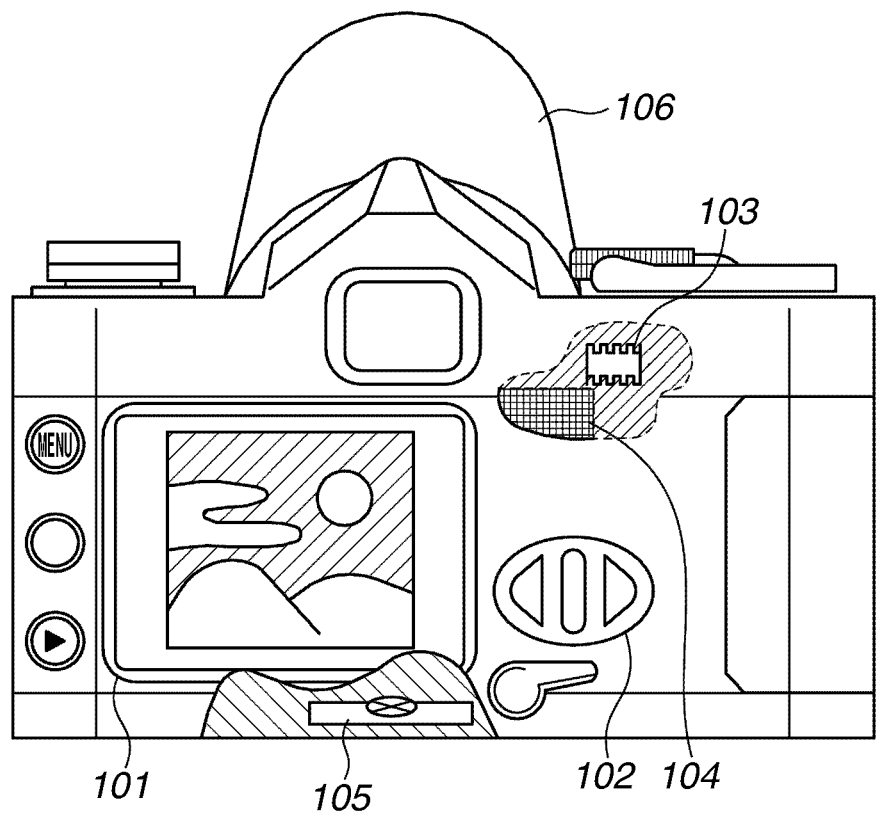
FIG. 1 illustrates an interchangeable-lens type digital camera according to a first exemplary embodiment of the present invention.

FIG. 1 illustrates an interchangeable-lens type digital camera serving as an imaging apparatus according to a first exemplary embodiment of the present invention. A display 101 is a display device provided on a rear surface of the camera. A set button 102 is an operation member to be operated to display a graphical user interface (GUI) on the display 101. A measurement function for an AF adjustment amount is activated by selecting auto AF adjustment processing from a GUI menu with the operation member. Further, the GUI can also be used for a confirmation operation when the processing proceeds to the next step in flowcharts described below.

A microcomputer 103, built into the camera, executes a control program of the digital camera. An image sensor 104, built into the camera, acquires digital images. A phase difference detection sensor 105, built into the camera, is used for phase difference AF. An interchangeable lens (hereinafter, also referred to as a lens) 106 is attached on a lens mount of the camera, and is configured to include a zoom lens.

Figure 2:
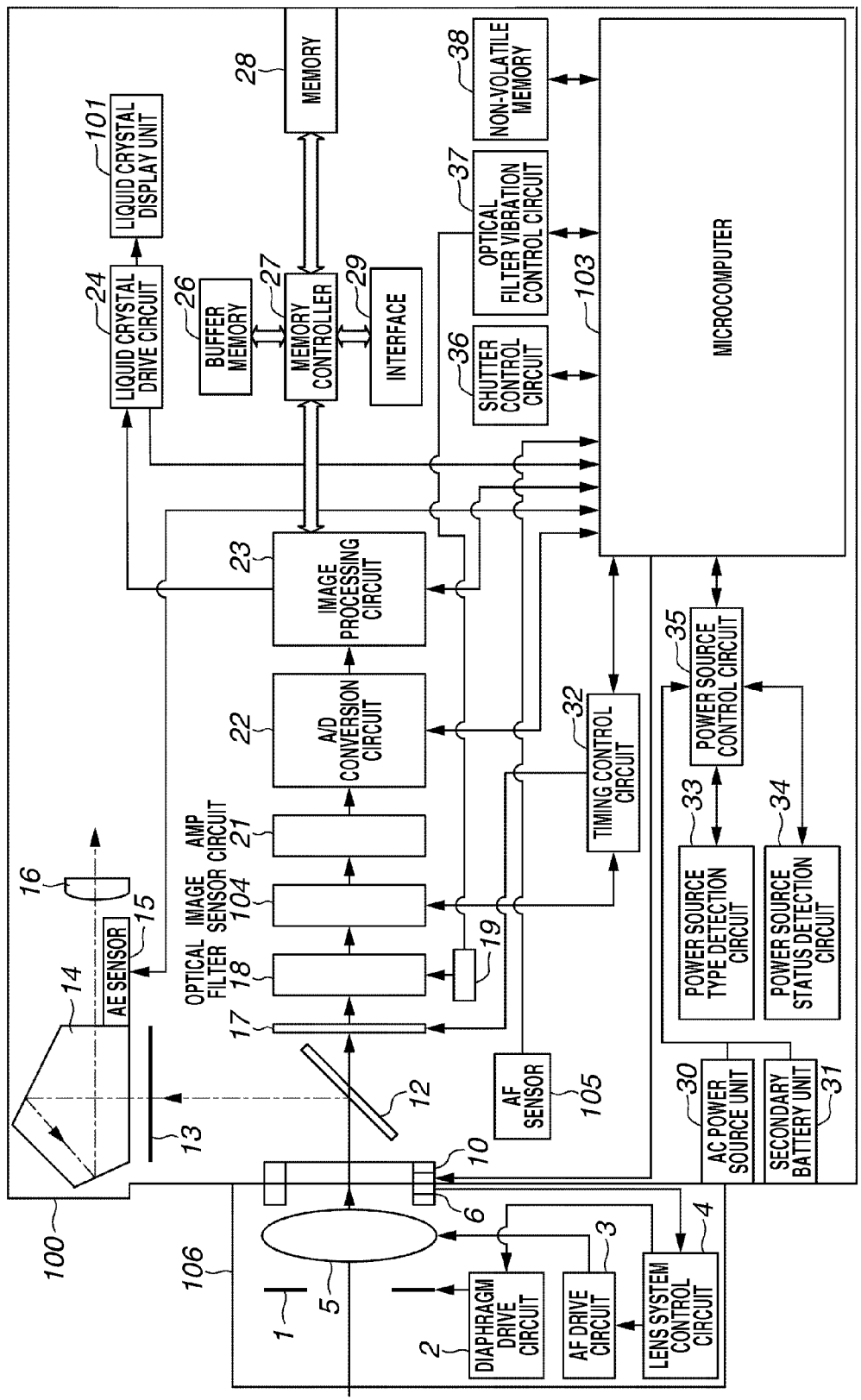
FIG. 2 is a block diagram illustrating a configuration example of the interchangeable-lens type digital camera according to the first exemplary embodiment.

FIG. 2 is a block diagram illustrating a configuration example of the interchangeable-lens type digital camera according to an exemplary embodiment of the present invention. A lens 5 of the interchangeable lens 106 is usually composed of a plurality of lenses, but in FIG. 2, only a single lens is illustrated for the sake of simplicity.

A communication terminal 6 is used for performing communication with a camera body 100 by the lens 106, and a communication terminal 10 is used for performing communication with the lens 106 by the camera body 100. The lens 106 communicates with a microcomputer 103 of the camera body 100 via the communication terminals 6 and 10. Accordingly, such communication enables a lens system control circuit 4 inside the lens 6 to control a diaphragm 1 via a diaphragm drive circuit 2, and to change the position of the lens 5 via an AF drive circuit 3 for focusing.

In the camera body 100, an automatic exposure (AE) sensor 15 measures a luminance of an object through the lens 106, and a quick-return mirror 12 is moved up and down by an actuator (not illustrated) upon being instructed from the microcomputer 103 during exposure. An operator can check focusing or composition of an optical image of the object obtained through the lens 106, by observing a focusing screen 13 via a pentagonal prism 14 and a finder 16.

A focal plane shutter 17 is configured to control an exposure time of an image sensor 104 under control of the microcomputer 103. An optical filter 18 is generally composed of a low-pass filter or the like, which cuts high-frequency components of light incident from the focal plane shutter 17 and guides the light from an object image to the image sensor 104. A piezoelectric element 19 is connected to the optical filter 18. Generally, an image sensor such as a charge coupled device (CCD) or a complementary metal-oxide-semiconductor (CMOS) is used for the image sensor 104, which photoelectrically converts an object image formed on the image sensor 104 through the lens 106 into an electric signal.

An amplifier circuit 21 amplifies the electric signal at a gain corresponding to a set shooting sensitivity. An analog-to-digital (A/D) conversion circuit 22 converts an analog signal, which has been converted into an electric signal by the image sensor 104, into a digital signal. An image processing circuit 23 performs filter processing, color conversion processing, and gamma/knee processing on image data converted into the digital signal by the A/D conversion circuit 22, and outputs the image data to a memory controller 27. Further, the image processing circuit 23 also has a digital-to-analog (D/A) conversion circuit built into itself, and can also convert image data which has been converted into the digital signal by the A/D conversion circuit 22 or image data which has been input by the memory controller 27 into an analog signal and can also output the analog signal to the liquid crystal display unit (display) 101 via a liquid crystal drive circuit 24. These image processing and display processing by the image processing circuit 23 are switched by the microcomputer 103. Further, the microcomputer 103 performs white balance adjustment based on color balance information of photographed images.

The memory controller 27 stores unprocessed image data input from the image processing circuit 23 in a buffer memory 26. Further, the memory controller 27 stores processed image data in a memory 28, and conversely captures image data from the buffer memory 26 or the memory 28 and outputs the image data to the image processing circuit 23. Further, the memory controller 27 can store image data sent via an external interface 29, such as a universal serial bus (USB), Institute of Electrical and Electronics Engineers (IEEE), or a high-definition multimedia interface (HDMI), in the memory 28, and conversely can also output the image data stored in the memory 28 to the outside via the external interface 29. Further, the memory 28 may be configured in a detachably attachable manner, and can include, for example, Compact-Flash®.

Via a timing control circuit 32, the microcomputer 103 controls drive timing of the image sensor 104. Electric power is supplied from an AC power source unit 30 or a secondary battery unit 31. A power source control circuit 35, upon receiving an instruction from the microcomputer 103, performs ON/OFF of the power source. Further, the power source control circuit 35 also notifies the microcomputer 103 of information about a current power source status detected by a power source status detection circuit 34 or current power source type information detected by a power source type detection circuit 33.

The microcomputer 103 controls the focal plane shutter 17 via a shutter control circuit 36. The microcomputer 103 causes the piezoelectric element 19 connected to the optical filter 18 to vibrate via an optical filter vibration control circuit 37. The piezoelectric element 19 is vibrated in accordance with an instruction of the microcomputer 103 so that the piezoelectric element 19 is vibrated with an amplitude of vibration, a vibration time, and an axial direction of vibration at respective predetermined values. A non-volatile memory (electrically erasable programmable read-only memory (EEPROM)) 38 can store setting values or data of shutter speeds, aperture values, shooting sensitivities, and the like, which have been arbitrarily set by a user, even when the camera is not powered on.

Figure 3:
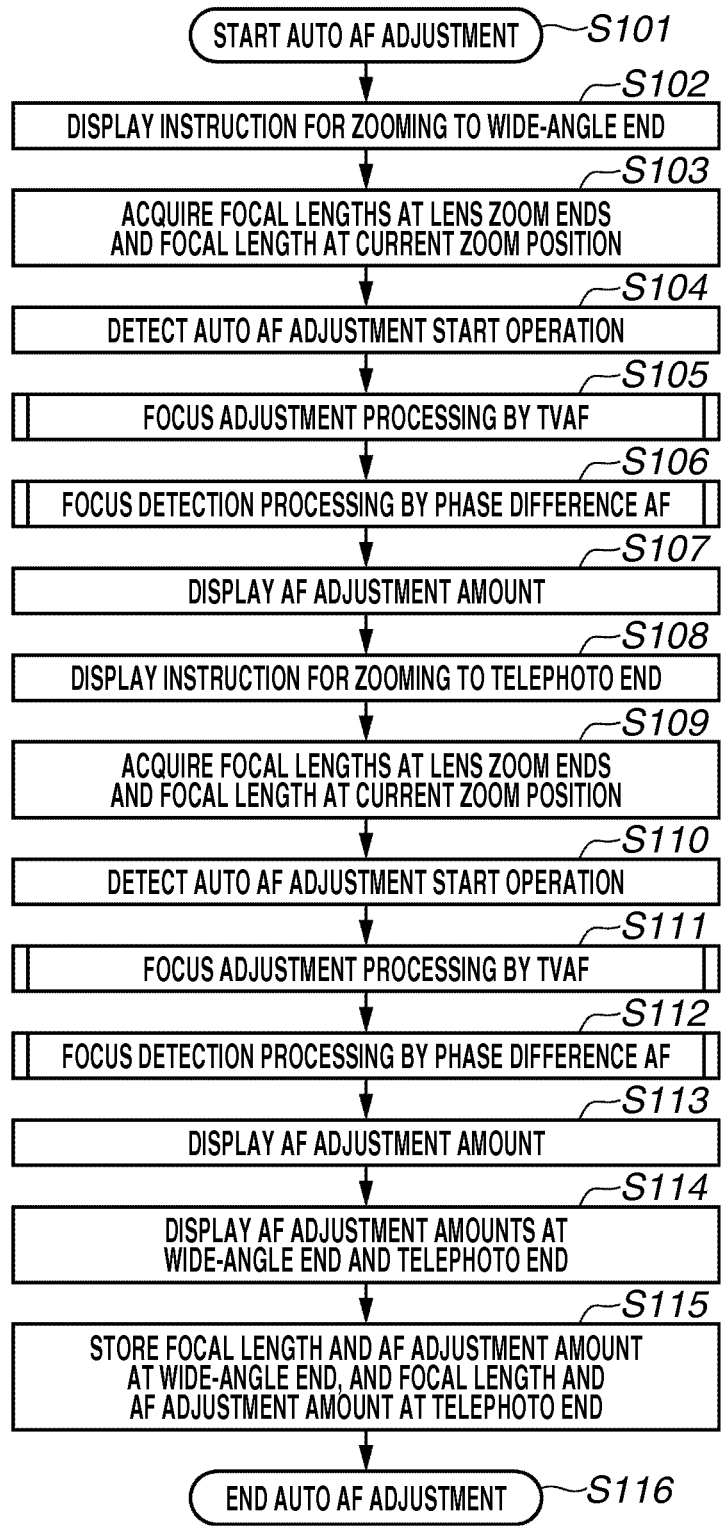
FIG. 3 is a flowchart illustrating a processing operation performed by a digital camera according to the first exemplary embodiment.

Next, a processing operation performed by the digital camera according to the present embodiment will be described with reference to FIG. 3. This flowchart is a flow of control processed by the microcomputer 103. In step S101, the microcomputer 103 starts auto AF adjustment processing. The flow from this step is executed by selecting a menu for executing the auto AF adjustment processing by an operation of the GUI menu when the lens 106 available for AF is mounted.

In step S102, the microcomputer 103 displays, as instruction display processing, an instruction for operating zoom of the lens 106 to the wide-angle end, which is a first zoom position, on the display 101. When the user has received this instruction display and has performed a zooming operation to the wide-angle end, the user presses the set button 102 to notify the microcomputer 103 of a completion of the zooming operation. In response to this notification, the microcomputer 103 advances to the next step S103.

In the present exemplary embodiment, different AF adjustment amounts are set at the wide-angle end and the telephoto end, and a linearly-interpolated AF adjustment amount is set at an intermediate focal length. More specifically, in a case where auto AF adjustment processing for measuring and setting AF adjustment amounts is performed, the user is asked to manually perform an operation to set the focal lengths of the zoom lens at the wide-angle end and the telephoto end at the time of measurement of the AF adjustment amounts. In that case, the microcomputer 103 displays an instruction, to the user, for performing zoom operations to the wide-angle end and the telephoto end. Both in the case of operating according to the instruction display and in the case of operating mistakenly, the user is required to complete the auto AF adjustment processing without any incompletion.

In step S103, the microcomputer 103 acquires, as focal length acquisition processing, focal length information at the telephoto end and the wide-angle end of the lens 106, and focal length information at the current zoom position. Since the lens 106 is subjected to manual zooming and thus may not be positioned at the wide-angle end regardless of the instruction display in step S102, the microcomputer 103 stores the acquired focal length information at the current zoom position.

In step S104, the microcomputer 103 waits for an auto AF adjustment processing start operation to be performed, and if the auto AF adjustment processing start operation has been performed, advances to step S105 for first AF adjustment amount measurement processing.

In step S105, the microcomputer 103 invokes a subroutine for performing focus adjustment processing by TVAF (also referred to as contrast AF). In this process, driving of the lens 106 is performed using the image sensor 104 so that focusing is attained on the image sensor 104.

In step S106, the microcomputer 103 invokes a subroutine for performing focus detection processing by phase difference AF. In this process, the microcomputer 103 detects a deviation amount between a focus position detected by TVAF and a focus position detected by phase difference AF. Since the microcomputer 103 only detects a focus deviation from the focus position detected by TVAF, driving of the lens 106 is not performed.

In step S107, the microcomputer 103 converts the focus deviation amount detected in step S106 into an AF adjustment amount and displays the AF adjustment amount on the display 101. When the user confirms the AF adjustment amount and presses the button, the processing proceeds to the next step S108.

In step S108, the microcomputer 103 displays, as instruction display processing, an instruction for operating zoom of the lens 106 to the telephoto end, which is a second zoom position, on the display 101. When the user has received the instruction display and has performed a zooming operation to the telephoto end, the user presses the set button 102 and notifies the microcomputer 103 of a completion of the zooming operation. In response to this notification, the microcomputer 103 advances to the next step S109.

In step S109, the microcomputer 103 acquires, as focal length acquisition processing, focal length information at the telephoto end and the wide-angle end and focal length information at the current zoom position of the lens 106. Since the lens 106 is subjected to manual zooming and thus may not be positioned at the telephoto end regardless of the instruction display in step S108, the microcomputer 103 stores the acquired focal length information at the current zoom position.

In step S110, the microcomputer 103 waits for the auto AF adjustment processing start operation to be performed, and if the auto AF adjustment processing start operation has been performed, advances to step S111 for second AF adjustment amount measurement processing.

In step S111, the microcomputer 103 invokes a subroutine for performing focus adjustment processing by TVAF. In this process, driving of the lens 106 is performed using the image sensor 104 so that focusing is attained on the image sensor 104.

In step S112, the microcomputer 103 invokes a subroutine for performing focus detection processing by phase difference AF. In this process, the microcomputer 103 detects a deviation amount between a focus position detected by TVAF and a focus position detected by phase difference AF. Since the microcomputer 103 only detects a focus deviation from the focus position detected by TVAF, driving of the lens 106 is not performed.

In step S113, the microcomputer 103 converts the focus deviation amount detected in step S112 into an AF adjustment amount and displays the AF adjustment amount on the display 101. When the user confirms the AF adjustment amount and presses the button, the processing proceeds to the next step S114.

In step S114, the microcomputer 103 displays an AF adjustment amount at the wide-angle end and an AF adjustment amount at the telephoto end. In this instance, since the AF adjustment amounts are recorded in conjunction with focal length information, the microcomputer 103 displays an AF adjustment amount with greater focal length information as the AF adjustment amount at the telephoto end, and displays an AF adjustment amount with smaller focal length information as the AF adjustment amount at the wide-angle end. If the zoom position is not at the zoom end but is halfway, AF adjustment amounts at the telephoto end and the wide-angle end may be displayed while indicating focal lengths thereof. Alternatively, the calculated values by extrapolating the AF adjustment amounts at the focal lengths at the telephoto end and the wide-angle end may be displayed. Accordingly, even when a sequence of the user's zooming operation is wrong, or the zoom end has not yet been reached, AF adjustments amounts at a plurality of focal lengths can be measured and set.

It is also possible to instruct a zooming operation without specifically indicating the wide-angle end or the telephoto end in steps S102 and S108. If this is the case, then as a problem before making a mistake, a specific instruction of how to operate zooming first cannot be performed. In the present exemplary embodiment, the camera has an advantage in that it is easy to understand when using for the first time, and that the processing advances without incompletion even if the user mistakes a sequence of the zooming operation when getting used to that.

In step S115, the microcomputer 103 stores the focal length and the AF adjustment amount at the wide-angle end, and the focal length and the AF adjustment amount at the telephoto end in a recording unit, such as a non-volatile memory (not illustrated). Then, in step S116, the microcomputer 103 ends the auto AF adjustment processing.

Next, a second exemplary embodiment of the present invention will be described with reference to FIG. 4. A configuration of the interchangeable-lens type digital camera is similar to that in the first exemplary embodiment, and hereinbelow, descriptions will be given with a focus on different points from the first exemplary embodiment.

Figure 4:
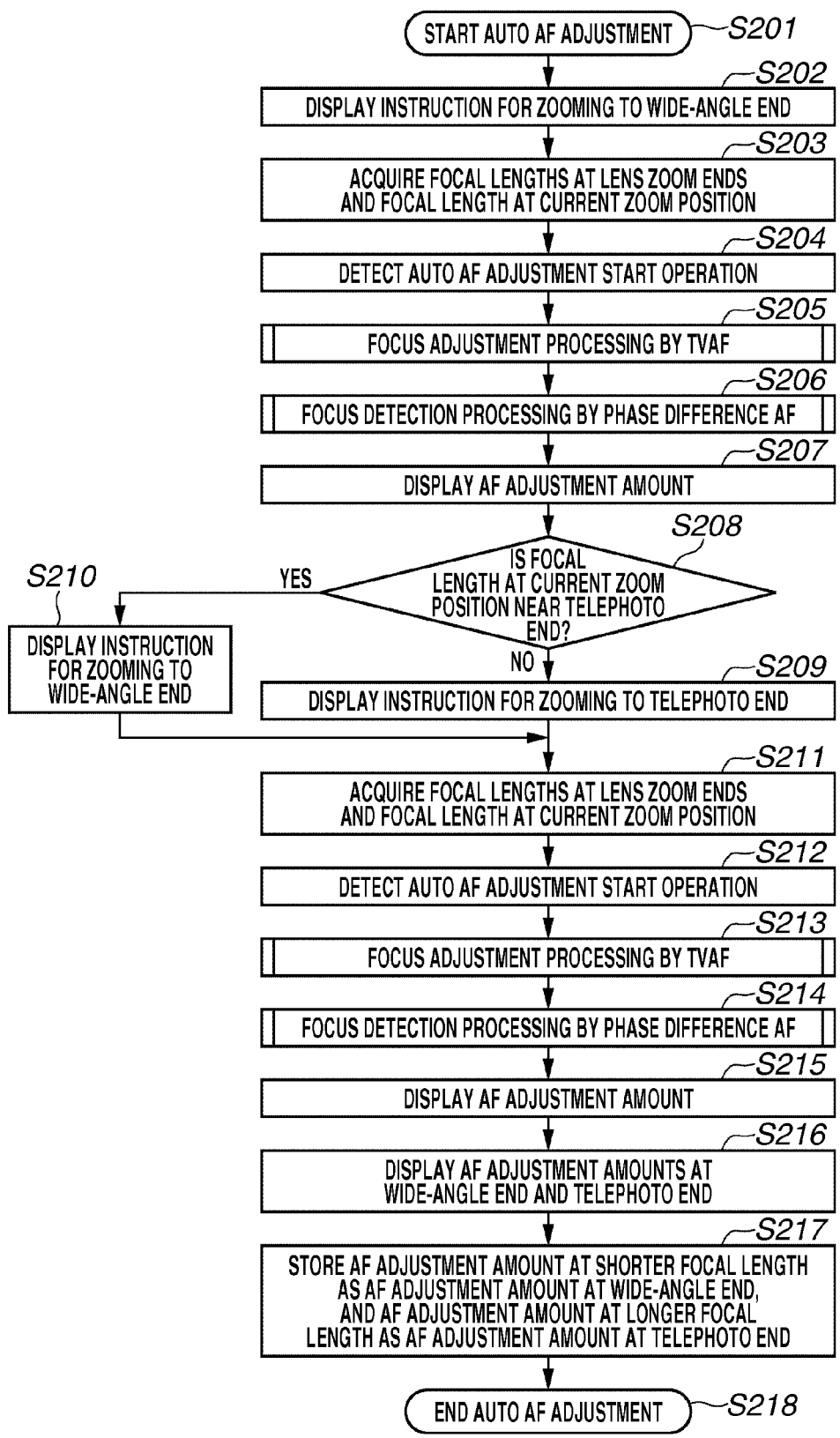
FIG. 4 is a flowchart illustrating a processing operation performed by a digital camera according to a second exemplary embodiment of the present invention.

In FIG. 4, processing in steps S201 to S207 is similar to processing in steps S101 to S107 in the first exemplary embodiment. In step S202, the microcomputer 103 displays an instruction for a zooming operation to the wide-angle end. In step S208, the microcomputer 103 determines whether a focal length at the current zoom position of the lens 106 is near the telephoto end. If the focal length at the current zoom position is not near the telephoto end (NO in step S208), the processing proceeds to step S209. In step S209, the microcomputer 103 displays an instruction for operating zooming of the lens 106 to the telephoto end on the display 101. On the other hand, if the focal length at the current zoom position is near the telephoto end (YES in step S208), the processing proceeds to step S210. In step S210, the microcomputer 103, again, displays an instruction for operating zooming of the lens 106 to the wide-angle end on the display 101. In this case, the AF adjustment amount in step S207 becomes an AF adjustment amount in a focal length near the telephoto end. Accordingly, in a case where the AF adjustment amount has been measured in the vicinity of the telephoto end in spite of a display instruction for the zooming operation to the wide-angle end, it becomes possible to display an instruction for correctly operating zooming to the other zoom end, at which the AF adjustment amount has not yet been measured. Processing in steps S211 to S218 is similar to processing in steps S109 to S116 in the first exemplary embodiment.

Next, a third exemplary embodiment of the present invention will be described with reference to FIG. 5. Hereinbelow, descriptions will be given with a focus on different point from the second exemplary embodiment.

Figure 5:
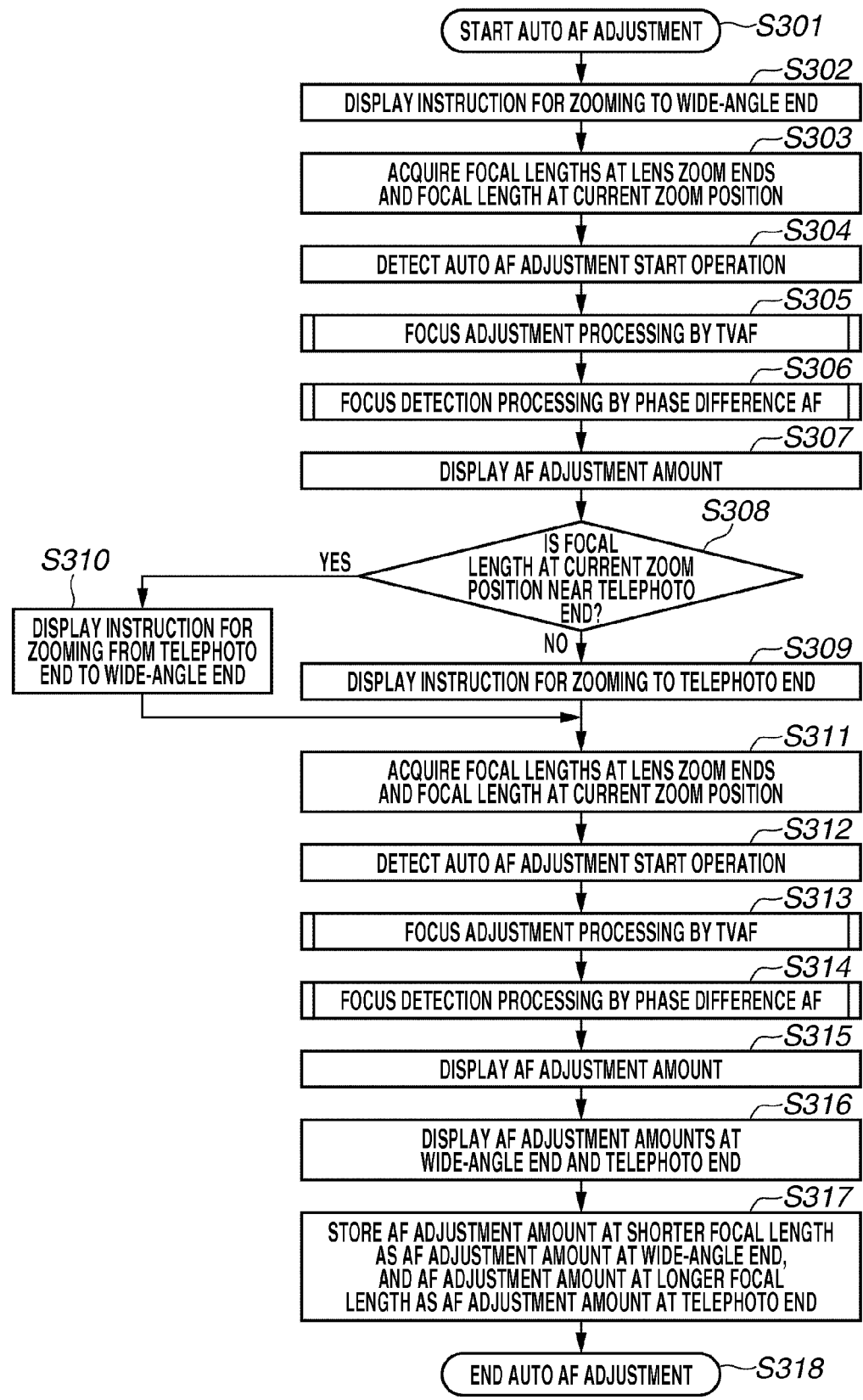
FIG. 5 is a flowchart illustrating a processing operation performed by a digital camera according to a third exemplary embodiment of the present invention.

In FIG. 5, processing in steps S301 to S309 and steps S311 to S318 is similar to processing in steps S201 to S209 and steps S211 to S218 in the second exemplary embodiment. A difference from the second exemplary embodiment is that, when the current zoom position is near the telephoto end, in step S310, the microcomputer 103 displays an instruction for operating zooming of the lens 106 from the telephoto end to the wide-angle end on the display 101. Because it means that the zoom position is near the telephoto end in step S308 despite that the microcomputer 103 has displayed an instruction for performing a zooming operation to the wide-angle end in step S302, there is a possibility that the user has mixed up the wide-angle end and the telephoto end. For this reason, the display has been devised to indicate that the zoom position at this point of time is near the telephoto end, and the extremity to which the lens can be moved from now is the wide-angle end. Therefore, when the user mixes up the telephoto end and the wide-angle end, this can prevent the user from being misled into thinking that "unknowingly already operated the lens to the telephoto end" even though the user actually has not operated zooming before the second measurement of an AF adjustment amount. Further, this can also indicate a correct relationship between the wide-angle end and the telephoto end to such a user who has intrinsically mixed up the wide-angle end and the telephoto end.

Figure 6:
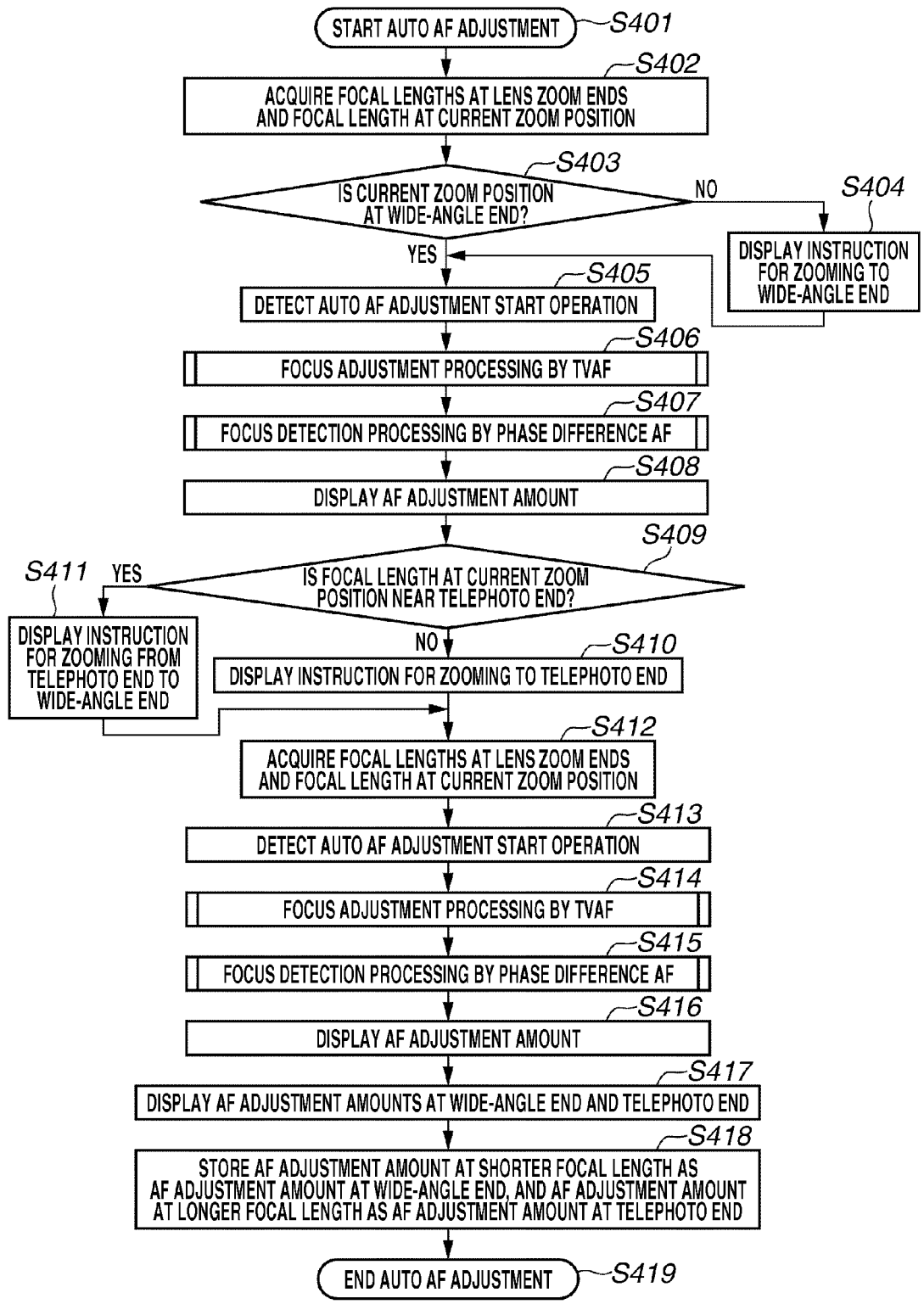
FIG. 6 is a flowchart illustrating a processing operation performed by a digital camera according to a fourth exemplary embodiment of the present invention.

Next, a fourth exemplary embodiment of the present invention will be described with reference to FIG. 6. Hereinbelow, descriptions will be given with a focus on different points from the first to the third exemplary embodiments.

In step S401, the microcomputer 103 starts auto AF adjustment processing. In step S402, the microcomputer 103 acquires focal length information at the telephoto end and the wide-angle end and focal length information at the current zoom position of the lens 106. Then, in step S403, the microcomputer 103 determines whether the current zoom position of the lens 106 is at the wide-angle end. If the current zoom position is at the wide-angle end (YES in step S403), the processing proceeds to step S405. If the current zoom position is not at the wide-angle end (NO in step S403), the processing proceeds to step S404. In step S404, the microcomputer 103 displays an instruction for operating zooming of the lens 106 to the wide-angle end on the display 101. Accordingly, unnecessary instruction display for prompting the user for a zooming operation to the wide-angle end although the zoom position is already at the wide-angle end can be prevented. Processing in steps S405 to S419 is similar to processing in steps S304 to S318 in the third exemplary embodiment.

Figure 7:
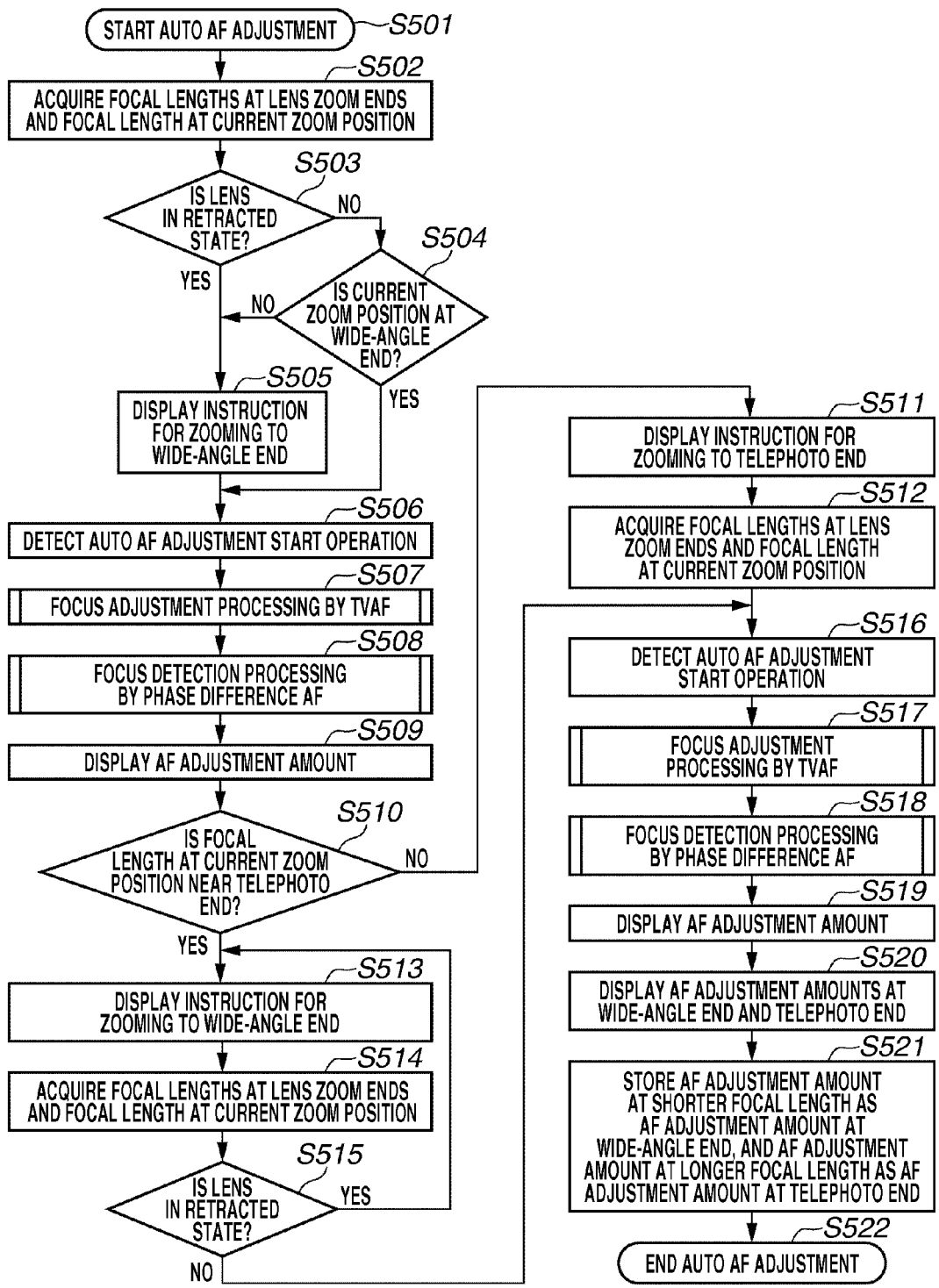
FIG. 7 is a flowchart illustrating a processing operation performed by a digital camera according to a fifth exemplary embodiment of the present invention.

Next, a fifth exemplary embodiment of the present invention will be described with reference to FIG. 7. Hereinbelow, descriptions will be given with a focus on different points from the first to the fourth exemplary embodiments.

In step S501, the microcomputer 103 starts auto AF adjustment processing. In step S502, the microcomputer 103 acquires focal length information at the telephoto end and the wide-angle end and focal length information at the current zoom position of the lens 106. Then, in step S503, the microcomputer 103 determines whether the lens 106 is in an AF-disabled stored state (retracted state), in which the total length of the lens 106 becomes shorter than in a photographable state. If the lens 106 is in the retracted state (YES in step S503), the processing proceeds to step S505. In step S505, the microcomputer 103 displays an instruction for operating zooming of the lens 106 to the wide-angle end on the display 101. On the other hand, if the lens is not in the retracted state (NO in step S503), the processing proceeds to step S504. In step S504, the microcomputer 103 determines whether the current zoom position of the lens 106 is at the wide-angle end. If the current zoom position is at the wide-angle end (YES in step S504), the processing proceeds to step S506. If the current zoom position is not at the wide-angle end (NO in step S504), the processing proceeds to step S505. Processing in steps S506 to S510 is similar to processing in steps S405 to S409 in the fourth exemplary embodiment.

In step S511, the microcomputer 103 displays an instruction for operating zooming of the lens 106 to the telephoto end on the display 10. When the user has received this instruction display and performed a zooming operation to the telephoto end, the user presses the set button 102 to notify the microcomputer 103 of a completion of the zooming operation. In response to this notification, the microcomputer 103 advances to step S512, and again, acquires focal length information at the telephoto end and the wide-angle end and focal length information at the current zoom position of the lens 106.

On the other hand, in step S513, the microcomputer 103 displays an instruction for operating zooming of the lens 106 to the wide-angle end on the display 101. When the user has received this instruction display and performed a zooming operation to the wide-angle end, the user presses the set button 10 to notify the microcomputer 103 of a completion of the zooming operation. In response to this notification, the microcomputer 103 advances to step S514, and again, acquires focal length information at the telephoto end and the wide-angle end and focal length information at the current zoom position of the lens 106. Next, in step S515, the microcomputer 103 determines whether the lens 106 is in the retracted state. This is because, as the result that the microcomputer 103 has displayed an instruction for zooming to the wide-angle end in step S513, the zoom ring may have been rotated too much, and thus the lens may be in the retracted state. If the lens 106 is in the retracted state (YES in step S515), the processing returns to step S513, and the microcomputer 103 displays an instruction for operating zooming of the lens 106 to the wide-angle end on the display 101. On the other hand, if the lens is not in the retracted state (NO in step S515), the processing proceeds to step S516. Accordingly, such a situation can be avoided that the user would be driven to continue processing in the retracted state, in which measurement of the AF adjustment amount is impossible, in the zoom lens which can be retracted by the zooming operation. Processing in steps S516 to S522 is similar to processing in step S413 to S419 in the fourth exemplary embodiment.

In the above-described exemplary embodiments, as the zoom position referred to, the wide-angle end and the telephoto end have been described, but it is not always necessary that the zoom position be the zoom end. Further, in the above-described exemplary embodiments, an example for setting AF adjustment amounts at two focal lengths at the wide-angle end and the telephoto end has been described, but a configuration for setting AF adjustment amounts at three or more focal lengths may be used.

Further, the above-described embodiments may also be realized by executing the following processing. That is, the processing for supplying software (program) implements the functions of the above-described exemplary embodiments to a system or an apparatus via a network or various types of storage media, and causes a computer (a CPU or a microprocessing unit (MPU)) of the system or the apparatus to read and execute the program.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-066411 filed Mar. 24, 2011, which is hereby incorporated by reference herein in its entirety.

What is claimed is:

1. An imaging apparatus capable of setting an autofocus (AF) adjustment amount of a zoom lens at a plurality of focal lengths, the imaging apparatus comprising:

a focal length acquisition unit configured to acquire a focal length;

a conversion unit configured to detect a deviation amount between a focus position detected by contrast AF and a focus position detected by phase difference AF and to convert the deviation amount into an AF adjustment amount;

an instruction display unit configured to display an instruction for prompting a zooming operation to a first zoom position in acquiring a first AF adjustment amount, wherein the instruction display unit is configured to display an instruction for prompting a zooming operation to a second zoom position with a focal length different from that of the first zoom position in acquiring a second AF adjustment amount; and a storage control unit configured to, in acquiring the first AF adjustment amount, control a memory to store the first AF adjustment amount and the focal length acquired by the focal length acquisition unit in association with each other, wherein the storage control unit is configured to, in acquiring the second AF adjustment amount, control the memory to store the second AF adjustment amount and the focal length acquired by the focal length acquisition unit in association with each other.

2. The imaging apparatus according to claim 1, wherein in a case where, after the instruction display unit has displayed the instruction for prompting a zooming operation to the first zoom position, a zoom position changed by a user operation is near the second zoom position, the instruction display unit is configured to display an instruction for prompting a zooming operation to the first zoom position.

3. The imaging apparatus according to claim 1, wherein in a case where, after the instruction display unit has displayed the instruction for prompting a zooming operation to the first zoom position, a zoom position changed by a user operation is near the second zoom position, the instruction display unit is configured to display that a current zoom position is near the second zoom position.

4. The imaging apparatus according to claim 1, wherein when a current zoom position is not the first zoom position, the instruction display unit is configured to display an instruction for prompting a zooming operation to the first zoom position.

5. The imaging apparatus according to claim 1, wherein the instruction display unit is configured to display an instruction for prompting a zooming operation when the zoom lens is disabled for AF.

* * * * *